United States Patent [19]

Nagano et al.

[11] 4,228,468
[45] Oct. 14, 1980

[54] OUTPUT CORRECTING SYSTEM FOR FACSIMILE

[75] Inventors: Humikazu Nagano, Nara; Hiromu Sasaki, Yamatokoriyama; Syoichi Yasuda, Nara, all of Japan

[73] Assignee: Sharp Kabushiki Kaisha, Osaka, Japan

[21] Appl. No.: 935,852

[22] Filed: Aug. 22, 1978

[30] Foreign Application Priority Data

Aug. 30, 1977 [JP] Japan .................................. 52/105554

[51] Int. Cl.² .............................................. H04N 1/40
[52] U.S. Cl. ............................. 358/280; 340/146.3 H; 358/213; 358/282
[58] Field of Search ............... 358/213, 280, 294, 282, 358/284, 256; 364/515; 340/146.3 H

[56] References Cited

U.S. PATENT DOCUMENTS

| 3,949,162 | 4/1976 | Malueg | 358/213 |
| 4,128,830 | 12/1978 | Weythman | 358/282 |
| 4,129,853 | 12/1978 | Althauser | 358/282 |

Primary Examiner—Howard W. Britton
Attorney, Agent, or Firm—Birch, Stewart, Kolasch & Birch

[57] ABSTRACT

An optical image reading apparatus comprises a solid state image sensor having a plurality of blocks, means for generating video signals correponding to an object to be read out by the solid state image sensor, means for determining respective mean values of the video signals concerning the blocks, means for storing the mean values in digital information, means for reading out the stored mean value and converting the digital information to analog information, and means for determining a corrected slice level in each of the blocks.

7 Claims, 7 Drawing Figures

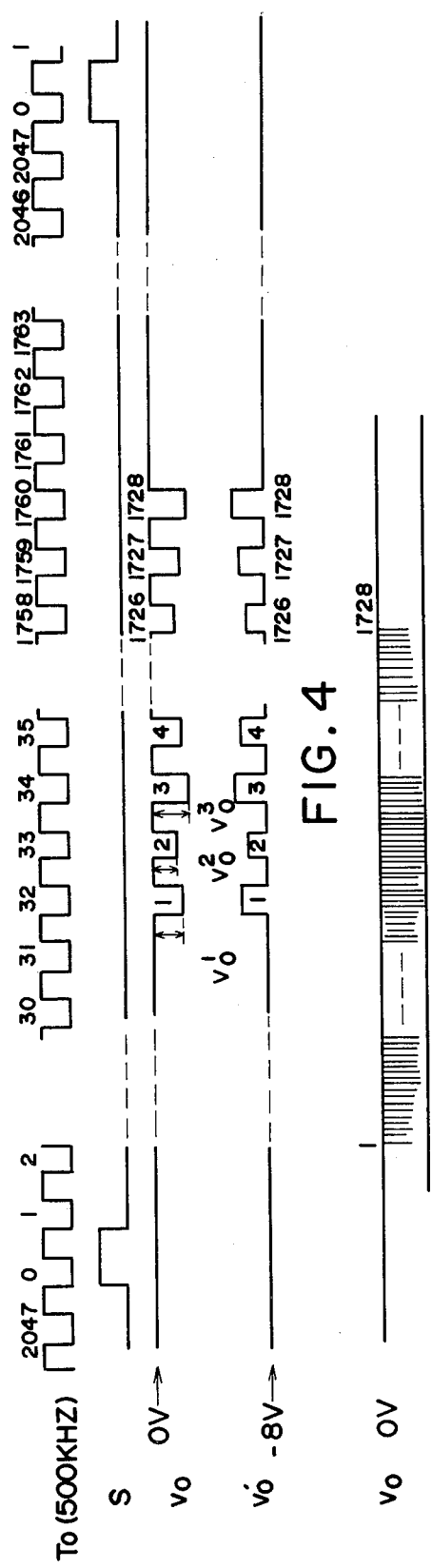
FIG. 4
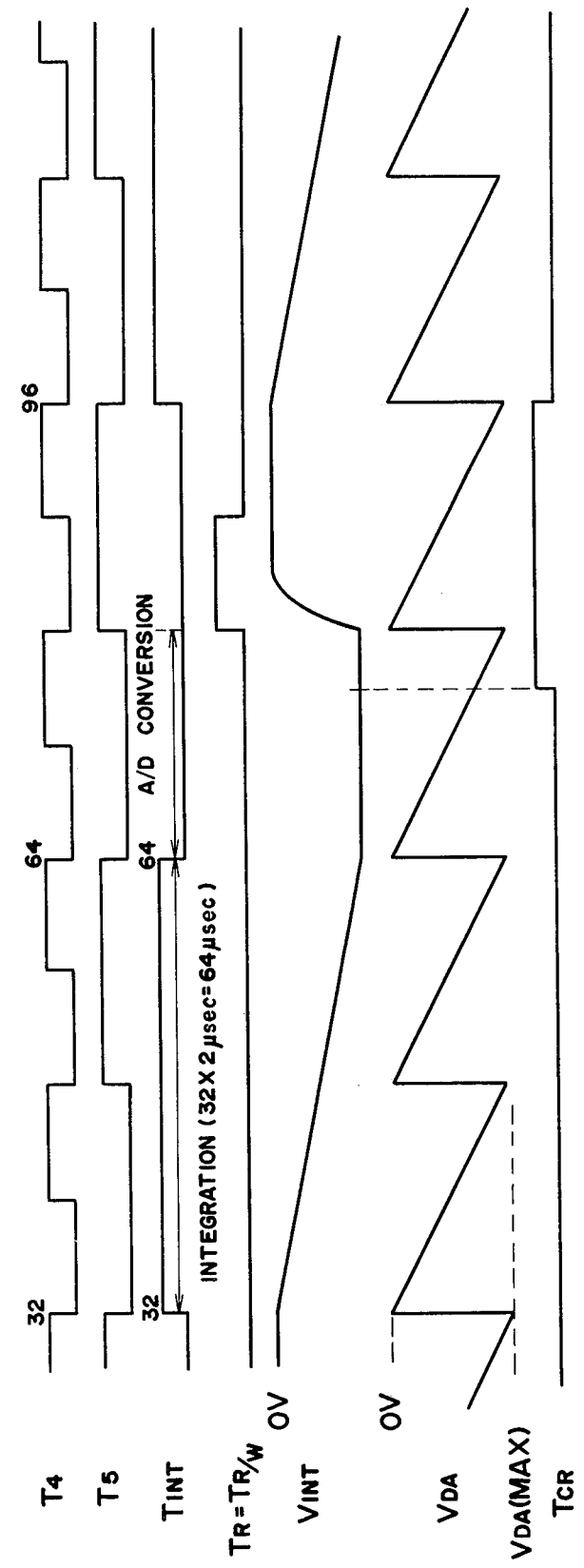
FIG. 5
FIG. 6

OUTPUT CORRECTING SYSTEM FOR FACSIMILE

BACKGROUND OF THE INVENTION

The present invention relates to a facsimile device and, more particularly, to an output correcting system for a facsimile device.

Recently, a solid state image sensor using large scale integration techniques such as a photo diode array, a charge coupled sensor device or the like has been employed as a photoelectric converter in an optical image reading apparatus such as a facsimile device. However, in utilizing the optical image reading apparatus, there is a problem that the output of the solid state image sensor is not uniform even when an object to be read is under a uniform illumination. The variations of the output of the solid state image sensor are contributed to not only by the optical system for reading the object but also deviations of the solid state image sensor.

OBJECTS AND SUMMARY OF THE INVENTION

Accordingly, it is an object of the present invention to provide an improved output correcting system for an optical image reading apparatus such as a facsimile device.

It is another object of the present invention to provide an improved output system for such an optical image reading apparatus to compensate for the variations derived from an optical reading system and a solid state image sensor or the like included within the optical reading apparatus.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to embodiment of the present invention, an optical image reading apparatus comprises an image sensor output correcting system where an object being read includes an output correcting portion where no information is recorded. The output correcting portion is scanned by a sensor array, and the sensor output is converted into a bi-valued signal having either a logic one level or a logic zero level while a slice level is precorrected when a portion of the object is scanned. The device is characterized in that the sensor output obtained from the image sensor output correcting system is subsequently corrected.

The sensor outputs corresponding to the output correcting portions are divided into a plurality of blocks, the sensor outputs being video signals. Each of the mean values of the video signals is in turn determined which is stored in a memory included within the image sensor output correcting system after being converted into digital information. The slice level is subsequently corrected by correcting values corresponding to both the brightness of the background and the mean value.

BRIEF DESCRIPTION OF THE DRAWINGS

The present invention will become more fully understood from the detailed description given hereinbelow and the accompanying drawings which are given by way of illustration only, and thus are not limitative of the present invention and wherein;

FIGS. 4 to 7 are time charts of a plurality of signals occurring within an optical image reading apparatus of the present invention.

DESCRIPTION OF THE PREFERRED EMBODIMENTS

For simplicity of description, the present invention will be described hereinbelow as embodied in an optical image reading apparatus employing a charge coupled sensor device of 1728 bits as a solid state sensor array. The charge coupled sensor device is, for example, divided into 54 blocks, each of which has 32 bits, although not limited to the charge coupled device and the number of the blocks.

Figure 1:
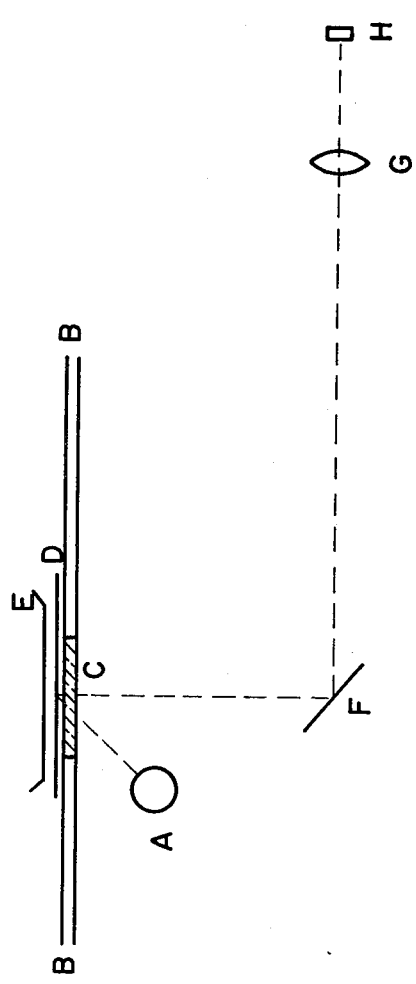
FIG. 1 is a diagrammatic representation of an optical image reading system adapted for use with the present invention.

FIG. 1 depicts an optical image reading system showing a principle of the optical image reading apparatus. The optical image reading system comprises an optical source A, a transport plate B, a transparent glass plate C, an object D to be read, and a pressing plate E. The object D is transported for reading purposes and positioned on the transparent glass plate C which is arranged below the transport plate B. The pressing plate E is provided for pressing the object D against the transparent glass plate C with uniform contact. The pressing plate E can simultaneously serve to provide a white background useful for determining an output correcting system described hereinbelow.

A mirror system F is provided for changing the direction of reflected light from the object D. A lens system G is arranged for transmitting the read light to a charge coupled sensor device H. The charge coupled sensor device H generates image sensor outputs of video signals in accordance with the read light.

Figure 2:
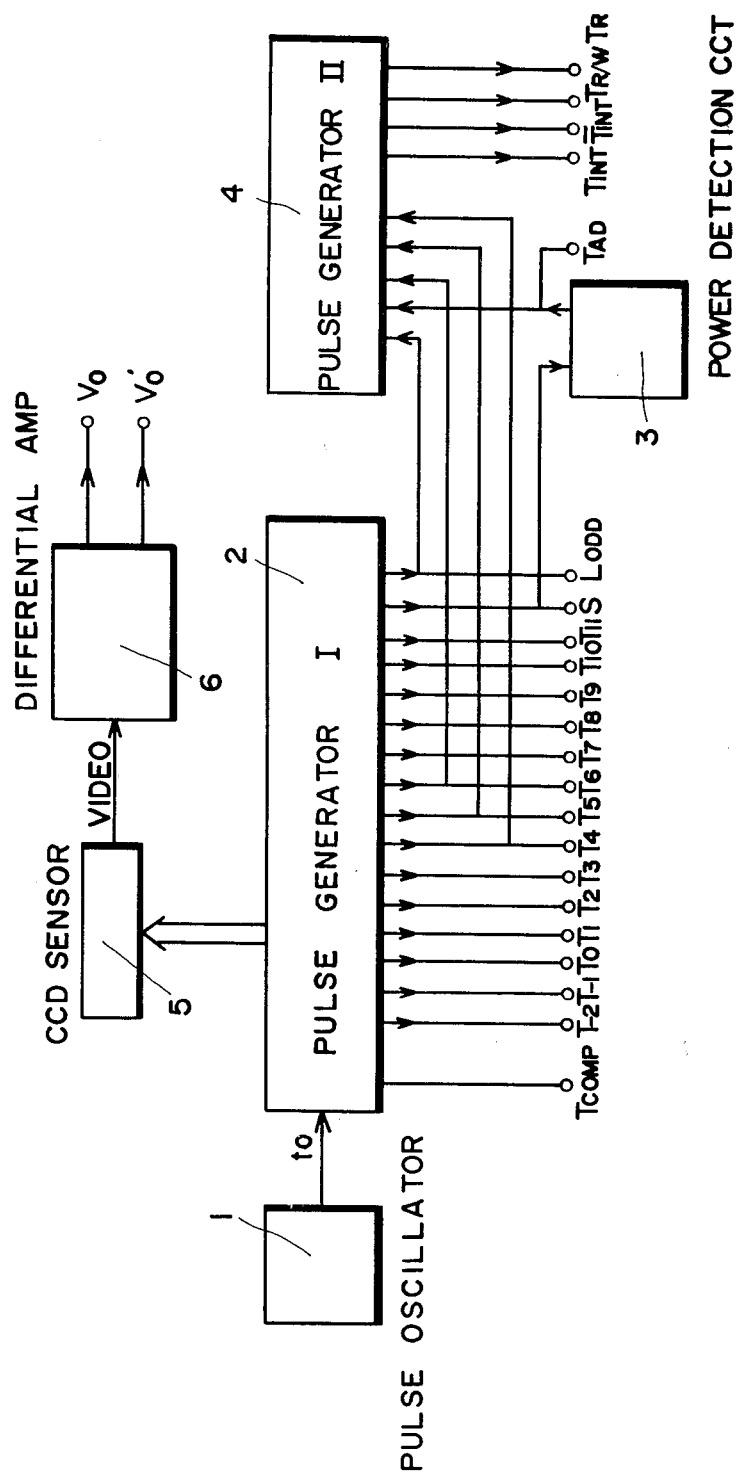
FIG. 2 is a block diagram of pulse generators for generating a plurality of timing signals for use with the present invention.

FIG. 2 illustrates pulse generators for generating a plurality of timing signals for use in the optical image reading apparatus of the present invention. A pulse oscillator 1 provides an output signal t0 of 4 MHz which is introduced into a pulse generator I2 of 14 bits. After the signal t0 is subsequently divided in the pulse generator I2, the pulse generator I2 provides a pulse signal of 2 MHz from an output terminal T-2, a pulse signal of 1 MHz from an output terminal T-1, a pulse signal of 500 KHz from an output terminal T0, and, finally, a pulse signal of 500 KHz/2048 (=2″) from an output terminal T11. When the pulse signals T0 of 500 KHz developed from the output terminal T0 are generated to a number of 2048, only one pulse signal is generated from an output terminal S. A pulse signal LODD derived from an output terminal LODD is reversed upon the rising of the pulse signal S generated from the output terminal S. A pulse signal developed from an output terminal TCOMP can be written as the following logical equation.

$$TCOMP = T\text{-}2 \cdot \overline{T5}$$

The output signal t0 derived from the pulse generator I2 is introduced into a charge coupled device sensor 5 related to the charge coupled device sensor H previously described. The charge coupled device sensor 5 generates a video output VIDEO in synchronization with the output signal t0, the video output VIDEO being a signal related to the object D (FIG. 1) to be read. The video output VIDEO is transferred into a differential amplifier 6. Therefore, the charge coupled device sensor 5 scans in synchronization with the pulse signal S.

The differential amplifier 6 has another input terminal in addition to the input terminal where the video output VIDEO is introduced, the additional input terminal being grounded. The differential amplifier 6 provides two outputs Vo and Vo' under the following relationship.

$$Vo + Vo' = \text{a constant}$$

A power detection circuit 3 is provided for sensing power supply for the optical image reading apparatus, the power detection circuit 3 receiving the pulse signal S. Immediately after the power supply, a pulse signal TAD derived from the power detection circuit 3 is inverted to a logic one and, thereafter, the pulse signal TAD is inverted to a logic zero in synchronization with the rising of the pulse signal S after several seconds when the optical source A (FIG. 1) has reached stable conditions.

A pulse generator II 4 is provided which receives both the pulse signals T4, T5, T6, LODD derived from the pulse generator I2 and the pulse signal TAD generated from the power detection circuit 3 to provide pulse signals TINT, $\overline{\text{TINT}}$, TR/W and TR. The pulse signal TINT functions to control a timing when mean values of backgrounds are determined as described below.

The pulse signal TINT is written as the following equation.

$$\text{TINT} = \text{LODD} \cdot T6 + \overline{\text{LODD}} \cdot \overline{T6}$$

Similarly, the pulse signals TR, and TR/W are as follows.

$$\text{TR} = \overline{\text{TR/W}} = \overline{\text{TAD}} \cdot \text{TINT} \cdot T4 \cdot T5$$

A peak circuit will be described below which is provided for determining a peak value from the video output VIDEO of the charge coupled device sensors without regard to the brightness of the background of the object D (FIG. 1).

Figure 3:
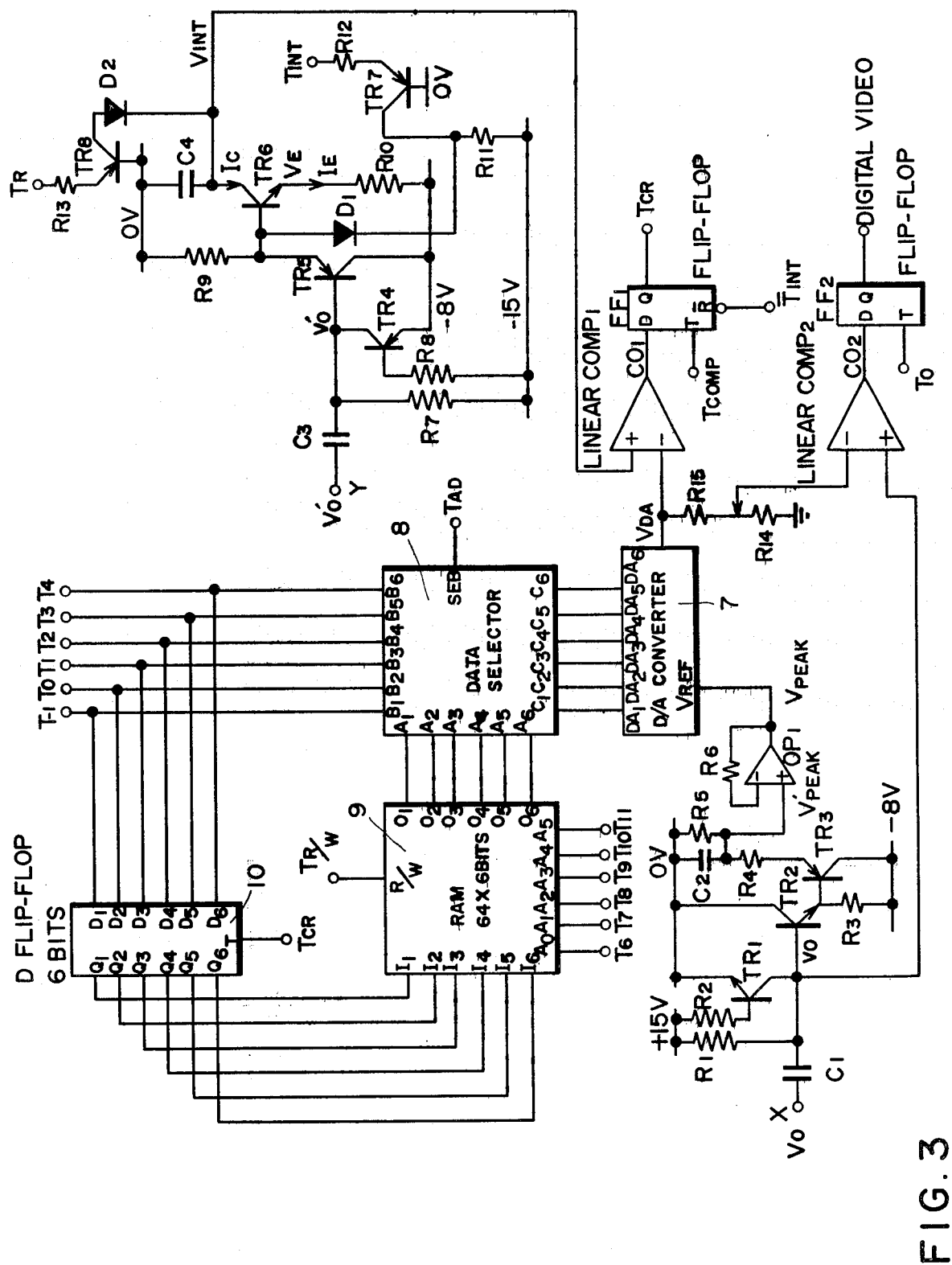
FIG. 3 is a block diagram of an image sensor output correcting system according to the present invention.

The output Vo of the differential amplifier 6 is applied to an input terminal x of FIG. 3 to be clamped by a clamping transistor TR1 through a level shifting condenser C1 so that a video signal v0 is provided when a white background portion is scanned as best shown in FIG. 4, the video signal v0 being developed in negative polarity. The bottom level of the video signal v0 is clamped at a level below ground corresponding to a saturation voltage of $V_{CE}$ between the collector and emitter terminals of transistor TR1. The magnitude of $V_{CE}$ can be neglected where that of the video signal v0 is assumed to be clamped to the ground. Two resistors R1 and R2 have a relationship of R2>R1. A time constant of C1R1 is selected much greater than a frequency of the pulse signal S.

The video signal v0 is applied to the base of a transistor TR2 for affecting an emitter follower operation. An emitter output of the transistor TR2 is then applied to the base of a transistor TR3 for affecting the emitter follower operation as well. The transistor TR3 has the emitter connected to a resistor R4 which is grounded through a condenser C2. A resistor R5 is connected in parallel to the condenser C2 for discharging purposes.

A peak signal V'PEAK is outputted from a connection between the condenser C2 and the resistor R4. The magnitude of the peak signal V'PEAK is near to the most negative level among the video signals v0. The peak signal V'PEAK is applied to a positive input terminal of an operational amplifier OP1 which is wired as a voltage follower type. The time constant of C2R5 is approximately several seconds and the magnitude of the resistor R5 is selected larger than that of the resistor R4.

Therefore, the operational amplifier OP1 generates a peak signal VPEAK equivalent to the peak signal V'PEAK. A D/A converter 7 of 6 bits receives the peak signal VPEAK at an input terminal $V_{REF}$. That is, the peak signal VPEAK is approximately equivalent to a peak value of the video signal v0 in negative polarity. The D/A converter 7 is wired so that a maximum value VDA (MAX) of a signal VDA developed from the D/A converter 7 is 1.1×VPEAK. The signal VDA is generated under the condition that inputs DA1, DA2, DA3, DA4, DA5, and DA6 of the D/A connector 7 are all logic ones.

The following is the description of operation of a circuit where each of the mean values regarding a plurality of blocks is determined from the obtained video signals v0 corresponding to a white background and converted to digital information to be stored.

The inputs DA1, DA2, DA3, DA4, DA5, and DA6 are related to outputs C1, C2, C3, C4, C5, and C6 of a data selector 8, respectively. Inputs A1, A2, A3, A4, A5, and A6 of the data selector 8 are connected respectively to outputs 01, 02, 03, 04, 05, and 06 of an RAM (random access memory) 9 of 64×6 bits. Inputs B1, B2, B3, B4, B5, and B6 of the data selected 8 have the respective pulse signals T-1, T0, T1, T2, T3, and T4 developed from the pulse generator I2. The pulse signal TAD applied to a selection terminal SEB of the data selector controls the selection of two input series of the data selector 8, the pulse signal TAD being developed from the power detection circuit 3. A relationship between the inputs and outputs of the data selector 8 is as follows.

(1) Under the condition of TAD=SEB=1 (logic1 one)

C1=B1,C2=B2,C3=B3, ... C6=B6.

(2) Under the condition of TAD=SEB=0 (logic zero)

C1=A1C2=A2C3=A3, ... C6=A6.

When the pulse signal TAD is assumed a logic one, the inputs of the D/A converter 7 have the pulse signals T-1, T0, T1, T2, T3, and T4 developed from the pulse generator I2. The data converter 7 generates from its output VDA a staircase which varies between the ground level and the magnitude of the VDA (MAX) as best shown in FIG. 6 as the pulse signals T-1, T0, T1, T2, T3, and T4 are subsequently counted.

A D-type flip-flop 10 of 6 bits has as its inputs D1, D2, D3, D4, D5, and D6 the pulse signals T-1, T0, T1, T2, T3, and T4. The D type flip-flop 10 has its outputs Q1 to Q6 connected respectively to inputs I1 to I6 of the RAM 9. The D-type flip-flop 10 has as a trigger input T an output TCR derived from a D-type flip-flop FF1 described below. Upon the rising of the TCR, signals applied to the respective inputs D1 to D6 are transferred to the respective outputs Q1 to Q6 and, simultaneously, to the inputs I1 to I6 of the RAM 9. The RAM 9 has as address signals the pulse signals T6, T7, T8, T9, T10, and T11 applied to its inputs A0 to A5.

It is assumed that the pulses of the pulse signal T0 are numbered in series from "0" to "2047". A address of the RAM 9 is "0" during a duration of "0" to "31" of the pulse signal T0. The address is "1" during a duration of "32" to "63" of the same. And, finally, the address is "63" during a duration of "2016" to "2047". Accordingly, the signals applied to the inputs I1 to I6 of the RAM 9 in accordance with the trigger of the TCR are stored in the respective addresses under the control of the pulse signals T6 to T11 applied to the inputs A0 to A5 of the RAM 9. The data of 6 bits to be stored in the RAM 9 depend on the timing when the D type flip-flop 10 is triggered.

The trigger signal TCR is derived as follows. With reference to FIG. 3 the output V0' of the differential amplifier 6 is impressed to an input terminal Y to be clamped by a clamping transistor TR4 through a level shifting condenser C3 so that a video signal v0' is derived.

It is assumed, for simplicity of description, that the video signal v0' is clamped at $-8$ volt although the video signal v0' is clamped to a bottom thereof at a level lower than $-8$ V. The magnitude of the lower level of the video signal corresponds to the saturation voltage (about 200 mV) of the collector-emitter bias VCE of the transistor TR4. It is wired so that the value of a resistor R3 is larger than that of a resistor R7 and the time constant of C3R7 is much longer than the frequency of the pulse signal S.

When the power supply is applied to the optical image reading apparatus of the present invention, the power detection circuit 3 provides the signal TAD of the logic one. Now it is assumed that the pulse signal LODD is the logic one. The video signal v0' is impressed to the base of the transistor TR5 for the emitter follower operation. The emitter of the transistor TR5 is connected to the base of the transistor TR6 for the emitter follower operation. As best seen in FIG. 6 (during a duration of "32" to "63" of the pulse signal T0), a transistor TR7 is turned on to thereby make the collector of the transistor TR7 grounded and reversely bias a diode D1. A gate circuit comprising the transistor TR7, the diode D1, and the resistors R11 and R12 is brought to an inoperative condition. The emitter voltage VE of the transistor TR6 is approximately equal to the video signal v0'. Therefore, the video signal v0' becomes $-8$ V.

The collector current IC and the emitter current IE of the transistor TR6 are described as follows.

$$IC = IE = \frac{VE \, (-8V)}{R10} = \frac{|v0|}{R10}$$

The discharge current IC of the condenser C4 is proportional to the magnitude of the video signal v0.

The respective video signals v0 concerning a scanning line are $v0^1$, $v0^2$ to $v0^{1728}$, respectively. Timings employed within the optical image reading apparatus of the present invention are set so that the n-th video signal $v0^n$ (n=1, 2, ... 1728) is developed when the pulse signals T0 are generated (31+n) times as best seen in FIG. 4. While the pulse signal T0 is being generated 32th pulse, the charging charge Q1 for the condenser C4 is considered.

The charging charge Q1 can be written as the following equation since the video signal v0 is developed ½ duty.

$$Q1 = \frac{v0'}{R10} \times T \times \tfrac{1}{2} \quad (T: \text{a frequency of the pulse signal } T0)$$

The charge Q32 which is charged during the logic one of the signal TINT can be written as follows.

$$Q32 = \frac{T}{2 \cdot R10} \sum_{n=1}^{32} v0^n$$

The magnitude of the voltage VINT at a terminal coupled to the condenser C4 can be written as follows.

$$VINT = \frac{T}{2CR10} \sum_{n=1}^{32} v0^n \qquad (1)$$

(C: the capacitance of the condenser (4))

$$= \frac{16T}{C \cdot R10} \cdot \frac{1}{32} \sum_{n=1}^{32} v0^n$$

When the resistor R10 is set so that $$\frac{16T}{CR10} = 1,$$

the above equation (1) can be represented as follows.

$$VINT = \frac{1}{32} \sum_{n=1}^{32} v0^n$$

It will be now apparent that the magnitude VINT is a mean value of the series of the video signals $v0^1$ to $v0^{32}$.

Thereafter, when the signal TINT is turned to the logic zero, the transistor TR0 is turned off to thereby forwardly bias the diode D1. The values of the resistors R9 and R11 have been selected so that the level of the anode of the diode D1, namely, the base of the transistor TR6 is restricted to the level a little lower than $-8$ V. Upon the non-conduction of the transistor TR6, the charging current to the condenser C4 is shut out to retain the value of the voltage VINT. As best illustrated in FIG. 6, the voltage VINT which is determined as a mean value during Therefore, in a linear comparator COMP1 where the output VINT and the output VDA are a positive and negative input terminals, respectively, the comparator change its output CO1 from the logic zero to the logic one when the output VDA becomes negative rather than the output VINT. Thereafter, a D-type flip-flop FF1 changes its output TCR from the logic zero to the logic one in response to the pulse signal TCOMP developed from the pulse generator 12. The pulse signal TCOMP serves to trigger the D-type flip-flop 10. In accordance with the trigger function of the output TCR, the flip-flop 10 transfers the pulse signals T-1 to T4 applied to itself to the RAM 9.

In other words, the output TCR developed from the comparator COMP1 controls the pulse signals T-1 to T4. A value is stored which is derived by conducting the A/D conversion to the mean value of the video signals $v0^1$ to $v0^{32}$ to become 6 bits.

The pulse signal TR/W is transferred to the logic zero in accordance with the equation.

$$TR = \overline{TR/W} = TAD \cdot TINT \cdot \overline{T4} \cdot T5$$

Then the output of the flip-flop 10 impressed to the inputs I1 to I6 of the RAM 9 are stored in the address 2 of the RAM 9 where the input A0 of the RAM 9 is the logic zero, the input A1 is the logic one, and the inputs A2 to A5 are all the logic zero since the pulse signal T0 exists between "32" to "63" thereof. Similarly, the charge charged in the condenser C4 is discharged through the resetting transistor TR8 and the diode D2 since the pulse signal TR is the logic one. The diode D2 functions to permit the reset level of the voltage VINT to be approximately grounded by cancelling the collector voltage of the transistor TR8 which is a little positive.

When the output voltage VINT is changed to the logic one again, the diode D1 is reversely biased in a manner similar to the above, to thereby make the gate circuit including the transistor TR7, the diode D1, and the resistors R11 and R12 inoperative. Therefore, the output voltage VINT coupled to the condenser C4 approaches the mean value defined by the video signals $v0^{65}$ to $v0^{96}$. A correction value for the second block is stored in the subsequent address of the RAM 9.

In a preferred embodiment of the present invention, the above-mentioned correction operation is conducted in such a manner that two scanning lines are a unit for scanning purposes. In a first scanning line correction values determined by, for example, odd-numbered blocks are stored in the RAM 9. In a second scanning line the correction values derived by, for example, even-numbered blocks are stored in the RAM 9.

The pulse signal LODD developed from the pulse generator I2 has the logic one and zero because of the existence of the pulse signal TAD developed from the power detection circuit 3 is a logic one during the several seconds after the power supply is turned on. Under the condition of the pulse signal LODD of the logic one, the RAM 9 stores the mean value determined by the video signals $v0^{1+64m}$, $v0^{2+64m}$ to $v0^{32+64m}$ (m=0, 1, ... 26) in 6 bits data after conducting the A/D conversion at the address (2m+2) thereof. Under the condition where pulse signal LODD is a logic zero, on the other hand, the RAM 9 stores the mean derived by the video signals $v0^{33+64m}$, $v0^{34+64m}$ to $v0^{64+64m}$ (m=0, 1, ... 26) in 6 bits data at the address (2m+3) thereof.

Figure 7:
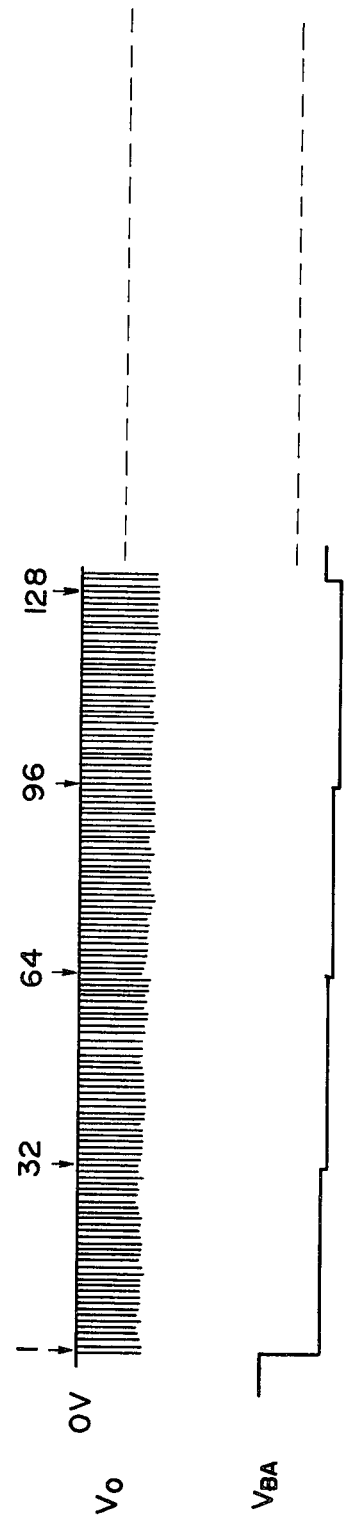

The RAM 9 stores in 6 bits data at a predetermined address the mean value determined by the video signals according the two scanning lines concerning 56 blocks just before the pulse signal TAD is transferred from the logic one to the logic zero. Thus the output correcting value is previously stored in the RAM 9 according to the variation of the optical image reading apparatus or the like by the standard of the white background. FIG. 7 illustrates the mean values determined respectively for the blocks in a relationship with the video signals v0.

When the output signal TAD developed from the power detection circuit is the logic zero, the pulse signal TR/W becomes the logic one. And bi-valued signals corresponding to the white or black through the use of a corrected slice level by scanning the object. The RAM 9 are in a condition for reading out the stored data upon the pulse signal TR/W of the logic one. The data selector is placed in such a manner that the outputs C1 to C6 are coupled to the respective inputs A1 to A6 of the data selector 8. Therefore, the address inputs for the D/A converter 7 have the outputs O1 to O6 of the RAM 9. The output VDA of the D/A converter 7 is the mean value determined by the video signals $v0^{1+32M}$, $v0^{2+32M}$ to $v0^{32+32M}$ (M=0,1, ... 53) regarding the respective blocks. The mean value derived by the video signals $v0^{1+32M}$ to $v0^{32+32M}$ (M=0, 1 ... 53) is converted to 6 bits by the AD conversion and, thereafter, decoded to the analog information.

If the output signal TAD is a logic zero, the 32 pulse signals TO are delayed as compared to when the output signal is a logic one since it is required that the address contents of the RAM 9 and the video signals v0 obtained by scanning the object be processed. The video signal v0 is utilized for determining the peak signal VPEAK which is applied to the input terminal VREF of the D/A converter 7, whereby the 6 bits data readout from the RAM 9, which is the mean value regarding the respective image sensor blocks, are corrected according to the brightness of the background to thereafter provide thus corrected value through the output of the D/A converter 7 as the signal VDA.

The signal VDA is divided by the resistors R14 and R15 to, thereafter, be impressed into a negative input terminal of the linear comparator COMP2 as a signal for finally determining the corrected slice level.

The video signal v0, on the other hand, is directly applied to a positive input terminal of the linear comparator COMP2. The linear comparator COMP2 causes the comparison between the video signal v0 and the signal VDA after being divided by the resistors R14 and R15 to determine the bi-valued signals corresponding to the logic one (black) or the logic zero (white).

Thus derived bi-valued signals developed from the linear comparator COMP2 are applied to the D input terminal of a D-type flip-flop FF2 to provide an output Q in response to the rising of the pulse signal TO which is used for a timing signal. The output Q is supplied to the optical image reading apparatus as a digital video signal bi-valued by the corrected slice level. Since the whiteness of the background of the object is proportional to the output VDA (MAX), the whiteness being relatively represented by the peak signal VPEAK while the object is being scanned, the corrected slice level is set so that it corresponds to the whiteness of the background.

Although the above description of the present invention is carried out regarding a plurality of the blocks each of which comprises 32 bits, two or more units of the video signals can be employed as one block within the knowledge of those skilled in the art.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical image reading apparatus comprising:
   a solid state image sensor for scanning a plurality of data blocks arranged in slices;

means for generating video signals corresponding to an image to be read by said solid state image sensor;

means for determining respective mean values of the video signals corresponding to each of said data blocks;

means for storing the mean values in a memory as digital information;

means for reading the stored mean values out of said memory and converting the digital information to analog information; and means for determining a corrected slice signal level in each of said blocks from said analog information.

2. An optical image reading apparatus comprising:

a solid state image sensor for scanning a plurality of data blocks arranged in slices;

means for generating video signals corresponding to an image to be read by said solid state image sensor;

means for generating a peak signal corresponding to the overall brightness of said image;

means for determining respective mean values of the video signals corresponding to each of said data blocks;

means for correcting the respective mean values using the peak signal and producing an output signal indicative ot this corrected mean value;

means for generating a slice level determining signal through the use of the output of the correcting means to provide a corrected slice signal level;

means for comparing the video signals with the corrected mean value derived from the corrected mean value derived from the corrected means to produce a bi-valued signal; and means for developing a corrected video signal by using the slice level determining signal.

3. The apparatus of claim 2 wherein said slice level determining signal corrects for non-uniformities in the background intensity of said video signal.

4. An optical image reading apparatus for reading images, said apparatus comprising:

a solid state image sensor scanning a plurality of data blocks, said data blocks dividing said data into an M×N array, said sensor scanning individual N bits of the M slices successively to scan the entire data;

means for generating video signals corresponding to an image to be read by said solid state image sensor;

means for determining respective mean values of the video signals corresponding to each of said data bits;

means for storing the mean values in a memory as digital information;

means for reading the stored mean values out of memory and converting the digital information to analog information; and means for determining a corrected slice signal level in each of said blocks from said analog information.

5. An optical image reading apparatus for reading images, said apparatus comprising:

a solid state image sensor scanning a plurality of data blocks;

means for generating video signals corresponding to the data to be read by said solid state image sensor;

means for determining respective mean values of the video signals corresponding to each of said data blocks;

a power supply;

means responsive to the energization of said power supply for storing the mean values in a memory as information; and means for reading the stored mean values out of memory and for using these values to correct the signal level of said video signals corresponding to said data.

6. The apparatus of claims 1, 2, 4, or 5 wherein said solid state image sensor comprises a charge coupled device.

7. The apparatus of claims 1, 2, 4, or 5 wherein said mean values correspond to the brightness of the image background.

* * * * *